United States Patent
Zhang et al.

(10) Patent No.: US 11,823,474 B2
(45) Date of Patent: Nov. 21, 2023

(54) HANDWRITTEN TEXT RECOGNITION METHOD, APPARATUS AND SYSTEM, HANDWRITTEN TEXT SEARCH METHOD AND SYSTEM, AND COMPUTER-READABLE STORAGE MEDIUM

(71) Applicant: BOE TECHNOLOGY GROUP CO., LTD., Beijing (CN)

(72) Inventors: Huanhuan Zhang, Beijing (CN); Guangwei Huang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 17/428,811

(22) PCT Filed: Oct. 27, 2020

(86) PCT No.: PCT/CN2020/124126
§ 371 (c)(1),
(2) Date: Aug. 5, 2021

(87) PCT Pub. No.: WO2022/087847
PCT Pub. Date: May 5, 2022

(65) Prior Publication Data
US 2022/0319214 A1    Oct. 6, 2022

(51) Int. Cl.
*G06V 30/226* (2022.01)
*G06V 30/30* (2022.01)
*G06V 30/18* (2022.01)

(52) U.S. Cl.
CPC ...... *G06V 30/2268* (2022.01); *G06V 30/1801* (2022.01); *G06V 30/30* (2022.01)

(58) Field of Classification Search
CPC . G06V 30/2268; G06V 30/1801; G06V 30/30
See application file for complete search history.

(56) References Cited

U.S. PATENT DOCUMENTS 5,105,468 A * 4/1992 Guyon ............... G06V 30/347
382/187
2004/0148577 A1  7/2004 Xu et al.
(Continued)

FOREIGN PATENT DOCUMENTS

CN     1701323 A     11/2005
CN   101183283 A      5/2008
(Continued)

*Primary Examiner* — Amandeep Saini
*Assistant Examiner* — Daniella M. DiGuglielmo
(74) *Attorney, Agent, or Firm* — The Webb Law Firm

(57) ABSTRACT

The present disclosure relates to a handwritten text recognition method, including: acquiring an information sequence including a plurality of track points of handwritten text, wherein information on each track point comprises its abscissa, writing time and writing state value; dividing the plurality of track points into a plurality of strokes according to the writing state value of each track point, the writing state value including a first value representative of stroke pen-up and a second value representative of stroke pen-down, respectively; calculating a first segmentation threshold of the handwritten text; determining a first text segmentation point according to a result of comparison between an absolute value of a difference between abscissas of a start track point of one stroke and an end track point of its previous stroke and the first segmentation threshold; and performing text segmentation according to the first text segmentation point to obtain a text segmentation result.

20 Claims, 8 Drawing Sheets

(56) References Cited

U.S. PATENT DOCUMENTS

| | | | |
|---|---|---|---|
| 2005/0222848 A1* | 10/2005 | Napper | G06F 16/50 707/706 |
| 2006/0050962 A1* | 3/2006 | Geiger | G06V 30/1423 382/186 |
| 2008/0123940 A1* | 5/2008 | Kundu | G06V 30/2268 382/186 |
| 2012/0078910 A1* | 3/2012 | Magdy | G06F 18/2137 707/E17.069 |
| 2018/0046607 A1 | 2/2018 | Reddy | |
| 2018/0129897 A1 | 5/2018 | Hinckley et al. | |

FOREIGN PATENT DOCUMENTS

| | | |
|---|---|---|
| CN | 101853126 A | 10/2010 |
| CN | 102156865 A | 8/2011 |
| CN | 104809483 A | 7/2015 |
| CN | 107122113 A | 9/2017 |
| CN | 110298343 A | 10/2019 |
| CN | 110619333 A | 12/2019 |
| CN | 110858291 A | 3/2020 |

* cited by examiner

```
┌─────────────────────────────────────────────┐
│     counting the maximum $X_{max}$ and the minimum │
│ $X_{min}$ of the abscissas, and the maximum $Y_{max}$ and │
│ the minimum $Y_{min}$ of the ordinates of the │─── S51
│ plurality of track points, to obtain an      │
│ abscissa range $X_{range}$ and an ordinate range $Y_{range}$ │
└─────────────────────────────────────────────┘
                      │
                      ▼
┌─────────────────────────────────────────────┐
│   calculating scaling coefficients $R_X$ and $R_Y$ │
│   according to the specified image sizes $I_{width}$ │─── S52
│   and $I_{height}$, the abscissa range $X_{range}$, and the │
│            ordinate range $Y_{range}$         │
└─────────────────────────────────────────────┘
                      │
                      ▼
┌─────────────────────────────────────────────┐
│ scaling the abscissa and ordinate of each track │
│   point respectively according to the scaling │─── S53
│   coefficients $R_X$ and $R_Y$, to obtain a plurality │
│    of track points with scaled coordinates    │
└─────────────────────────────────────────────┘
                      │
                      ▼
┌─────────────────────────────────────────────┐
│    connecting the plurality of track points  │
│ with the scaled coordinates to form the      │─── S54
│ handwritten text image, wherein an end track │
│ point of one stroke is not connected with a  │
│ start track point of its next stroke         │
└─────────────────────────────────────────────┘
```

Fig. 2A

HANDWRITTEN TEXT RECOGNITION METHOD, APPARATUS AND SYSTEM, HANDWRITTEN TEXT SEARCH METHOD AND SYSTEM, AND COMPUTER-READABLE STORAGE MEDIUM

CROSS-REFERENCE TO RELATED APPLICATION

This application is the United States national phase of International Application No. PCT/CN2020/124126 filed Oct. 27, 2020, the disclosure of which is hereby incorporated by reference in its entirety.

TECHNICAL FIELD

The present disclosure relates to the field of computer technologies, and in particular, to a handwritten text recognition method, apparatus and system, a handwritten text search method and system, and a computer-readable storage medium.

BACKGROUND

Compared with traditional keyboard input, handwritten input is widely applied due to its advantages of simplicity, convenience, high efficiency and the like. Handwritten recognition facilitates natural human-computer interaction. With the development of technologies, touch screens provide users with a better handwritten input mode, allowing the users to input multiple lines of text online.

In order to recognize multiple lines of handwritten inputted characters, it is necessary to segment multiple lines of text into single-line text, and then, a resulting sequence of text lines is sequentially input into a system capable of performing single-line continuous handwritten recognition for character recognition. Therefore, the accuracy of segmentation for multiple lines of text has a significant impact on the performance of the character recognition system.

Related text line segmentation technologies are mainly based on the analysis of horizontal and vertical projection histograms of continuous handwriting, and the accuracy of segmentation is poor.

SUMMARY

According to some embodiments of the present disclosure, there is provided a handwritten text recognition method comprising:
  acquiring an information sequence comprising a plurality of track points of handwritten text, wherein information on each track point comprises its abscissa, writing time and writing state value;
  dividing the plurality of track points into a plurality of strokes according to the writing state value of each track point, wherein the writing state value comprises a first value representative of stroke pen-up and a second value representative of stroke pen-down, respectively;
  calculating a first segmentation threshold of the handwritten text;
  determining a first text segmentation point according to a result of comparison between an absolute value of a difference between abscissas of a start track point of one stroke and an end track point of its previous stroke and the first segmentation threshold; and performing text segmentation according to the first text segmentation point to obtain a text segmentation result.

In some embodiments, that determining a first text segmentation point comprises: in the case that the absolute value of the difference between the abscissas of the start track point of the one stroke and the end track point of its previous stroke is greater than the first segmentation threshold, determining the start track point as the first text segmentation point.

In some embodiments, the first segmentation threshold comprises a first sub-segmentation threshold, and that calculating a first segmentation threshold of the handwritten text comprises: calculating the first sub-segmentation threshold of the handwritten text according to statistical information on the absolute value of the difference between the abscissas of the start track point of each stroke except a first stroke and the end track point of its previous stroke in the handwritten text.

In some embodiments, the statistical information comprises a mean and a variance, and that calculating a first segmentation threshold of the handwritten text comprises: calculating the first sub-segmentation threshold according to a sum of the mean and the variance.

In some embodiments, the first segmentation threshold further comprises a second sub-segmentation threshold, and the calculating a first segmentation threshold of the handwritten text comprises: calculating the second sub-segmentation threshold according to a difference between a maximum and a minimum of abscissas of the plurality of track points.

In some embodiments, in the case that the variance is greater than or equal to the mean, or the first sub-segmentation threshold is greater than or equal to the second sub-segmentation threshold, deciding whether the absolute value of the difference between the abscissas of the start track point of one stroke and the end track point of its previous stroke is greater than the first segmentation threshold.

In some embodiments, in the case that the absolute value of the difference is greater than the first segmentation threshold, that determining the start track point as the first text segmentation point comprises: in the case that the absolute value of the difference is greater than the first sub-segmentation threshold or the second sub-segmentation threshold, determining the start track point as the first text segmentation point.

In some embodiments, the handwritten text recognition method further comprises:
  before determining the first text segmentation point, determining a second text segmentation point according to a result of comparison between writing time differences corresponding to the plurality of strokes and a second segmentation threshold; and according to the second text segmentation point, dividing the plurality of strokes into at least one text segmentation unit, wherein the writing time differences between the strokes in each text segmentation unit are less than or equal to the second segmentation threshold.

In some embodiments, the information on each track point further comprises its ordinate, and the handwritten text recognition method further comprises:
  before determining the first text segmentation point, determining a third text segmentation point according to a result of comparison between a distance between the start track point of one stroke and the end track point of its previous stroke and a third segmentation threshold; and according to the third text segmentation point, segmenting the strokes in each text segmentation unit obtained according to the second text segmentation point to obtain a plurality of text segmentation subunits, wherein the distance between the start track point of one stroke and the end track point of its previous stroke in each text segmentation subunit is less than or equal to the third segmentation threshold.

In some embodiments, the third segmentation threshold is determined according to an average length of the plurality of strokes.

In some embodiments, the first segmentation threshold is determined according to an average length of strokes in each text segmentation subunit.

In some embodiments, that performing text segmentation according to the first text segmentation point to obtain a text segmentation result comprises:

merging the text segmentation units based on a result of comparison between overlapping degrees between ordinate ranges of track points included in the text segmentation units obtained according to the first text segmentation point and a merging threshold, to obtain the text segmentation result.

In some embodiments, the handwritten text recognition method further comprises:

forming a handwritten text image according to the information sequence of the handwritten text comprising the plurality of track points;

performing text detection of the handwritten text image by using an offline text detection algorithm to obtain at least one text detection box;

identifying a text detection box to which each track point belongs; and correcting the text segmentation result according to a result of the identification.

In some embodiments, that correcting the text segmentation result according to a result of the identification comprises:

deleting track points not belonging to any text detection box;

for track points belonging to the text detection boxes, judging whether two adjacent track points belong to different text detection boxes; and in the case that the two adjacent track points belong to different text detection boxes, segmenting the two adjacent track points to obtain two text segmentation subunits.

In some embodiments, the information on each track point further comprises its ordinate, and that forming a handwritten text image according to the information sequence of the handwritten text comprising the plurality of track points, comprises:

counting a maximum $X_{max}$ and a minimum $X_{min}$ of the abscissas, a maximum $Y_{max}$ and a minimum $Y_{min}$ of the ordinates of the plurality of track points, to obtain an abscissa range $X_{range}=X_{max}-X_{min}$ and an ordinate range $Y_{range}=Y_{max}-Y_{min}$;

calculating scaling coefficients $R_X=I_{width}/X_{range}$ and $R_Y=I_{height}/Y_{range}$ according to specified image sizes $I_{width}$ and $I_{height}$, the abscissa range $X_{range}$ and the ordinate range $Y_{range}$;

scaling the abscissa and the ordinate of each track point respectively according to the scaling coefficients $R_X$ and $R_Y$, to obtain a plurality of track points with scaled coordinates; and connecting the plurality of track points with the scaled coordinates, to form the handwritten text image, wherein the end track point of one stroke is not connected with the start track point of its next stroke.

In some embodiments, that identifying a text detection box to which each track point belongs comprises:

separately identifying text areas surrounded by different text detection boxes, to generate a text detection identification image, wherein an image area not belonging to any text area in the text detection identification image has a first pixel value, text areas surrounded by a same text detection box have a same second pixel value, and text areas surrounded by different text detection boxes have different second pixel values; and identifying the text detection box to which each track point belongs according to a pixel value at a corresponding position of each track point in the text detection identification image.

In some embodiments, the handwritten text recognition method further comprises: for one track point in each stroke, deleting the track point in the case that a difference between slopes of lines connecting the track point with its previous and next track points is less than or equal to a change threshold.

In some embodiments, the handwritten text recognition method further comprises: normalizing the ordinates of the track points included in each text segmentation unit, the abscissas being scaled with the ordinates in proportion.

In some embodiments, the handwritten text recognition method further comprises: obtaining an angle of each text segmentation unit relative to a horizontal direction by using a minimum bounding rectangle algorithm; and performing rotation transformation of the track points included in each text segmentation unit according to the angle of each text segmentation unit.

In some embodiments, the handwritten text recognition method further comprises: recognizing the text segmentation result using a text recognition model of bidirectional long/short term memory (BiLSTM), to obtain a text recognition result.

According to other embodiments of the present disclosure, there is provided a handwritten text search method comprising:

acquiring an information sequence comprising a plurality of track points of handwritten text to be searched;

dividing the plurality of track points into a plurality of strokes;

recognizing the handwritten text to be searched using a stroke-based handwritten text recognition model, to obtain a text recognition result; and in response to a search command input by a user, executing a corresponding search in the obtained text recognition result.

In some embodiments, that recognizing the handwritten text to be searched to obtain a text recognition result comprises: recognizing the handwritten text to be searched according to the handwritten text recognition method of any of the foregoing embodiments, to obtain the text recognition result.

According to other embodiments of the present disclosure, there is provided a handwritten text recognition apparatus comprising:

an acquisition unit configured to acquire an information sequence comprising a plurality of track points of handwritten text, wherein the information on each track point comprises its abscissa, writing time and writing state value;

a division unit configured to divide the plurality of track points into a plurality of strokes according to the writing state value of each track point, wherein the writing state value comprises a first value representative of stroke pen-up and a second value representative of stroke pen-down, respectively;

a calculation unit configured to calculate a first segmentation threshold of the handwritten text;

a determination unit configured to determine a first text segmentation point according to a result of comparison between an absolute value of a difference between abscissas of a start track point of one stroke and an end track point of its previous stroke and a first segmentation threshold; and a segmentation unit configured to perform text segmentation according to the first text segmentation point to obtain a text segmentation result.

According to still other embodiments of the present disclosure, there is provided an electronic device comprising:

a memory; and a processor coupled to the memory, wherein the processor is configured to perform one or more steps of the handwritten text recognition method or the handwritten text search method of any of the foregoing embodiments based on instructions stored in the memory.

According to still other embodiments of the present disclosure, there is provided a handwritten text recognition system comprising:

a touch screen configured to generate an information sequence comprising a plurality of track points when a user writes characters on the touch screen; and the handwritten text recognition apparatus according to any of the foregoing embodiments.

In some embodiments, the handwritten text recognition system further comprises: a terminal configured to acquire the information sequence comprising the plurality of track points generated when the characters are written on the touch screen, and send the information sequence to the handwritten text recognition apparatus.

According to further embodiments of the present disclosure, there is provided a handwritten text search system comprising:

the handwritten text recognition system according to any of the foregoing embodiments, configured to recognize handwritten text to be searched to obtain a text recognition result; and a search engine configured to in response to a search command input by a user, execute a corresponding search in the obtained text recognition result.

According to other embodiments of the present disclosure, there is provided a computer-readable storage medium having stored thereon a computer program which, when executed by a processor, implements one or more steps of the handwritten text recognition method or the handwritten text search method of any of the foregoing embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the present disclosure and, together with the specification, serve to explain the principles of the present disclosure.

The present disclosure can be more clearly understood from the following detailed description in conjunction with the accompanying drawings, in which:

FIG. 2A is a flow diagram illustrating forming a handwritten text image according to an embodiment of the present disclosure;

It should be understood that, dimensions of various parts shown in the drawings are not drawn to an actual scale. Further, identical or similar reference numerals denote identical or similar components.

DETAILED DESCRIPTION

Various exemplary embodiments of the present disclosure will now be described in detail with reference to the accompanying drawings. The description of the exemplary embodiments is merely illustrative and is in no way intended to limit this disclosure, its application, or uses. The present disclosure can be implemented in many different forms and is not limited to the embodiments described herein. These embodiments are provided to make this disclosure thorough and complete, and fully convey the scope of the present disclosure to those skilled in the art. It should be noted that: the relative arrangement of parts and steps set forth in these embodiments should be construed as an example only and not as a limitation unless specifically stated otherwise.

All terms (including technical or scientific terms) used herein have the same meanings as commonly understood by one of ordinary skill in the art to which this disclosure belongs unless specifically defined otherwise. It will be further understood that, terms defined in, for example, common dictionaries, should be interpreted as having meanings consistent with their meanings in the context of the related art, and will not be interpreted in an idealized or extremely formal sense unless expressly defined herein.

Techniques, methods, and apparatus known to one of ordinary skill in the related art may not be discussed in detail, but they are intended to be a part of the specification where appropriate.

Figure 1:
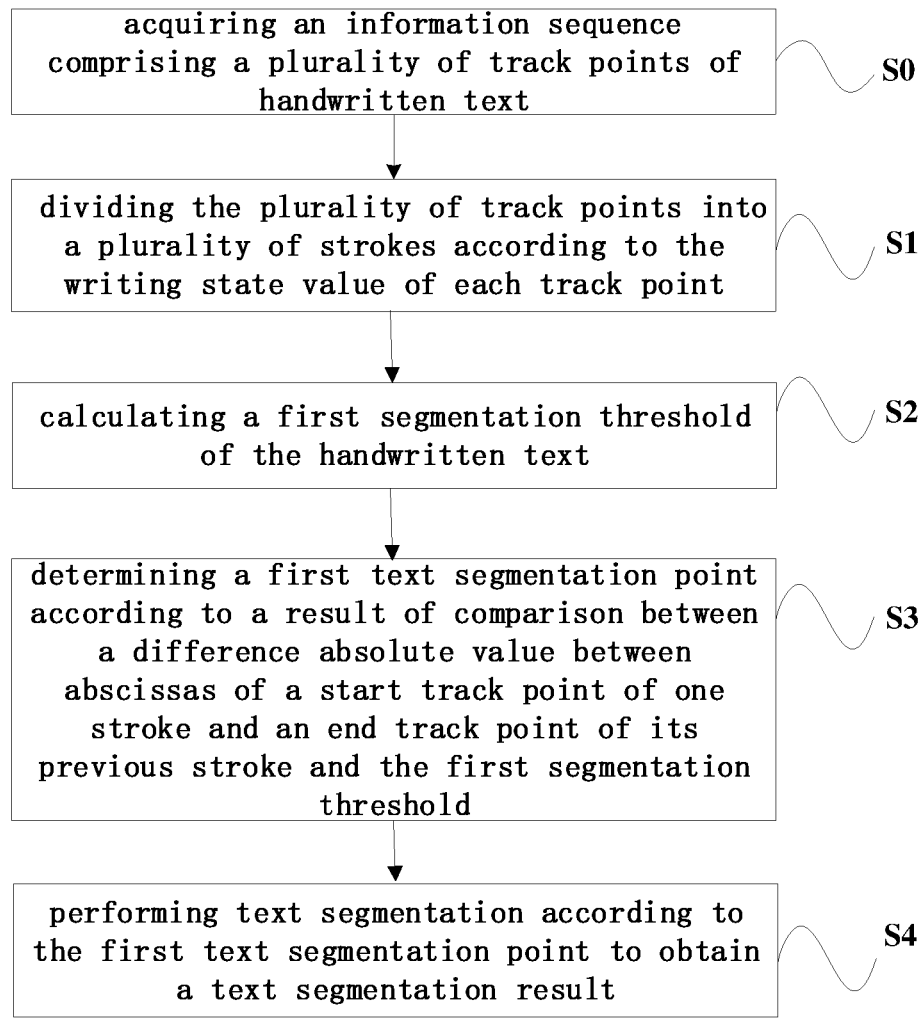
FIG. 1 is a flow diagram illustrating a handwritten text recognition method according to an embodiment of the present disclosure.

FIG. 1 is a flow diagram illustrating a handwritten text recognition method according to an embodiment of the present disclosure. As shown in FIG. 1, the handwritten text recognition method comprises: step S0, acquiring an information sequence of handwritten text comprising a plurality of track points; step S1, dividing the plurality of track points into a plurality of strokes according to a writing state value of each track point; step S2, calculating a first segmentation threshold of the handwritten text; step S3, determining a first text segmentation point according to a result of comparison between an absolute value of a difference between abscissas of a start track point of one stroke and an end track point of its previous stroke and a first segmentation threshold; and step S4, performing text segmentation according to the first text segmentation point to obtain a text segmentation result.

Each track point of the handwritten text, acquired in the step S0, can comprise information of multiple dimensions. The plurality of track points constitute an information sequence. For example, the information on each track point can comprise its abscissa, and also its ordinate. The information on each track point can further comprise its writing time and writing state value. The writing state value comprises a first value and a second value respectively representative of stroke pen-up and pen-down. For example, the writing state value of an end track point of one stroke is a first value (e.g., 1) representative of pen-up, and the writing state value of a start track point of one stroke is a second value (e.g., 0) representative of pen-down. Of course, the writing state value can also comprise a third value representative of pen-pressing writing or pen-moving. Thus, the plurality of track points can be divided into a plurality of strokes according to the writing state value of each track point in the step S1.

In some embodiments, an information sequence comprising a plurality of track points is generated when characters are written on a touch screen. For example, when writing on a touch screen such as an electromagnetic screen and capacitive screen, an information sequence of handwritten track points stored in order of time are acquired. In other embodiments, a terminal such as a conference all-in-one machine, mobile phone, and intelligent ink tablet, uses software to acquire handwritten track point sequence information generated by writing characters on the touch screen, and can transmit the handwritten track point sequence information to a cloud server or an embedded terminal according to actual requirements of services.

Based on the acquired sequence of the track points, how to segment the handwritten text will be described below.

A stroke represents a process from pen-pressing writing to pen-up. A text segmentation point will not appear in the middle of one stroke, but it can be only a start point of one stroke. A character (Chinese character, English letter or symbol) may typically be composed of a plurality of strokes. On the one hand, only if a start point of one stroke is far enough from an end point of its previous stroke, it is possible for the two strokes to be in different written text lines. On the other hand, even for two text lines written on a same page, character lengths are not necessarily the same, and thus, a distance between a start point of one stroke and an end point of its previous stroke is not fixed.

In view of uncertainty in the length of the written text line and different resolutions of different touch screens, in order to make the segmentation of the handwritten text independent of application scenarios and hardware equipment, it is needed to determine the segmentation threshold, instead of using a fixed threshold, but using a dynamic threshold, for example, according to the input handwritten text track point sequence information.

In some embodiments, in view of daily writing habits and time attributes of the handwritten track point sequence, the first segmentation threshold can be calculated according to an absolute value of a difference between abscissas of a start point of one stroke and an end point of its previous stroke, as a first sub-segmentation threshold.

For example, the first sub-segmentation threshold of the handwritten text is calculated according to statistical information on an absolute value of a difference between abscissas of a start track point of each stroke except a first stroke and an end track point of its previous stroke in the handwritten text. The statistical information can comprise a mean and a variance.

In some embodiments, the first sub-segmentation threshold is calculated according to a sum of the mean and the variance. For example, the first sub-segmentation threshold (Thred$_1$)=mean (X$_{mean}$)+variance (X$_{var}$).

The written text may include more characters, such as multiple lines of characters, or may include only a few characters, such as a line of characters, or even a single character. In view of the universality of text segmentation, in the case of very few characters, the segmentation threshold is at least half of an overall width of a character in order to improve the accuracy of text segmentation. In other embodiments, the first segmentation threshold comprises a second sub-segmentation threshold in addition to the first sub-segmentation threshold. The second sub-segmentation threshold (Thred$_2$) can be calculated according to a difference between a maximum (X$_{max}$) and a minimum (X$_{min}$) of abscissas of the plurality of track points. For example, Thred$_2$=(X$_{max}$−X$_{min}$)×k, where k is determined according to actual situations and takes the value of [0.5, 1]. The longest text line typically written in actual application scenarios is more than 2 characters, where k can take 0.5.

In step S3, for each stroke except the first stroke in the handwritten text, it is judged whether the absolute value of the difference between the abscissas of the start track point of the stroke and the end track point of its previous stroke is greater than the first segmentation threshold. In the case that the absolute value of the difference between the abscissas of the start track point of the one stroke and the end track point of its previous stroke is greater than the first segmentation threshold, the start track point is determined as the first text segmentation point. For example, each track point can be traversed in turn to determine the start and end points of each stroke. If a track point is a start point of one stroke and the stroke is not a first one, then the above judgment is made.

In some embodiments, in the case that the variance is greater than or equal to the mean, or the first sub-segmentation threshold is greater than or equal to the second sub-segmentation threshold, it is judged whether the absolute value of the difference between the abscissas of the start track point of one stroke and the end track point of its previous stroke is greater than the first segmentation threshold. On the contrary, in the case that the variance is less than the mean and the first sub-segmentation threshold is less than the second sub-segmentation threshold, generally the track point sequence of the input handwritten text only has single-line data, and in that case, it is unnecessary to segment the track point sequence of the handwritten text, and thus it is unnecessary to make the above judgment.

The mean reflects an average change of the absolute value of the difference between the abscissas, while the variance reflects a degree of the absolute value of the difference between the abscissas deviated from the mean. For multiple lines of characters, since a difference between an end point of a last stroke of a last character of a line and a start point of a first character of its next line is generally great, the variance is great; whereas for only one single line of characters, the variance will be less. If a line of characters is very long, the case that the first sub-segmentation threshold is less than the second sub-segmentation threshold would occur. Meanwhile, the limitation that the variance is less than the mean and the first sub-segmentation threshold is less than the second sub-segmentation threshold is for making the condition of not segmentation stricter.

In the step S3, for example, in the case that the absolute value of the difference is greater than the first sub-segmentation threshold or the second sub-segmentation threshold, the start track point is determined as the first text segmentation point. In step S4, text segmentation is performed according to the determined first text segmentation point to obtain a text segmentation result. In some embodiments, each first text segmentation point can serve as a start point of a text segmentation unit. A text segmentation unit corresponds to a line of characters. For example, for 3 lines of characters, a start point of a first stroke of a 2nd line is a text segmentation point from which the text is segmented into a 1st line of characters and remaining characters; similarly, a start point of a first stroke of a 3rd line is also a text segmentation point from which the text is segmented further into 2nd and 3rd lines of characters.

In some embodiments, the start point of each stroke and the end point of its previous stroke can be traversed in turn. If the absolute value of the difference is greater than the first sub-segmentation threshold or the second sub-segmentation threshold, the first text segmentation point is determined in the step S4. In general, for multiple lines of the handwritten text, the calculated first sub-segmentation threshold is greater than the second sub-segmentation threshold. Therefore, here we can only compare the absolute value of the difference with the second sub-segmentation threshold. If the absolute value of the difference is less than or equal to the second sub-segmentation threshold, text segmentation is not performed.

In the above embodiment, the strokes are divided based on the writing state values of the track points, and the text lines are segmented based on the counted result of the absolute value of the difference between abscissas of a start point of one stroke and an end point of its previous stroke, which can improve the accuracy of text segmentation.

In some embodiments, to improve the efficiency of text segmentation, the handwritten text can be roughly segmented based on the writing time of the track points in the strokes, and then be finely segmented (i.e., determining the first text segmentation point) based on the abscissas and the writing state values of the track points.

For example, before the first text segmentation point is determined, a second text segmentation point is determined according to a result of comparison between the writing time differences corresponding to the plurality of strokes and a second segmentation threshold (also called time threshold); and then, the plurality of strokes are divided into at least one text segmentation unit according to the second text segmentation point, wherein the writing time differences between the strokes in each text segmentation unit are less than or equal to the time threshold.

The time threshold can be determined based on the statistical information of the time differences between the strokes. Different time thresholds can be set according to different application scenarios. For example, in the case of daily handwriting, the time threshold can be set to 10 seconds.

In other embodiments, in order to further improve the accuracy of the text segmentation, especially for the handwritten text written obliquely, before the first text segmentation point is determined based on the abscissas of the track points, the ordinates of the track points can also be taken into account, and distances between the track points are utilized to roughly segment the handwritten text.

For example, a third text segmentation point is determined according to a result of comparison between a distance between a start track point of one stroke and an end track point of its previous stroke and a third segmentation threshold (also called distance threshold) first; and then, the strokes in each text segmentation unit obtained according to the second text segmentation point are segmented according to the third text segmentation point, to obtain a plurality of text segmentation subunits, wherein the distance between the start track point of one stroke and the end track point of its previous stroke in each text segmentation subunit is less than or equal to the distance threshold.

It should be understood that, both the rough segmentation by using the distance between the track points and the rough segmentation by using the writing time of the track points can be performed, or only one of them can be performed. If both are performed, considering that the accuracy of the text segmentation based on the distance between the track points is higher than that of the text segmentation based on the writing time of the track points, the text segmentation using the writing time of the track points can be performed first, and then, on this basis, the text segmentation based on the distance between the track points is performed.

The distance threshold can be determined according to an average length of the plurality of strokes. For example, for each stroke, three track points, i.e., a start point, a middle point and an end point, are taken, and distances between the three track points are calculated and added together as the length of each stroke; and then, the average length of all the strokes is counted, a multiple (e.g., 2.5 times) of which is taken as a distance threshold.

For the strokes in each text segmentation subunit, in the case that the absolute value of the difference between the abscissas of the start track point of one stroke and the end track point of its previous stroke is greater than the segmentation threshold, the start track point is determined as the first text segmentation point.

It should be appreciated that, the first segmentation threshold in different embodiments is calculated in different ways. In this embodiment, in view of different stroke lengths of large and small fonts, the first segmentation threshold is determined according to the average length of the strokes in each text segmentation subunit, and a multiple (e.g., 1.5 times) of the average length is taken as the segmentation threshold herein.

In still other embodiments, in order to further improve the accuracy of the text segmentation, especially to avoid dividing the handwritten text in a same line into different lines (i.e. multiple text segmentation units/subunits), when the text segmentation result is obtained according to the first text segmentation point in the step S4, the text segmentation units obtained according to the first text segmentation point can further be appropriately merged. Based on a result of comparison between overlapping degrees between ordinate ranges of the track points included in each text segmentation unit and a merging threshold, the text segmentation units can be merged to obtain the text segmentation result. For example, in the case that the overlapping degree between the ordinate ranges of two text segmentation units is greater than a merging threshold (e.g., 0.5), the two text segmentation units are merged into one text segmentation unit.

While various text segmentation manners in the handwritten text recognition method, which cover various embodiments of rough segmentation and fine segmentation of the handwritten text and the merging of the segmentation results, have been described above, it should be understood that these embodiments can be combined as needed. One of such combinations is shown in FIG. 1A.

Figure 1A:
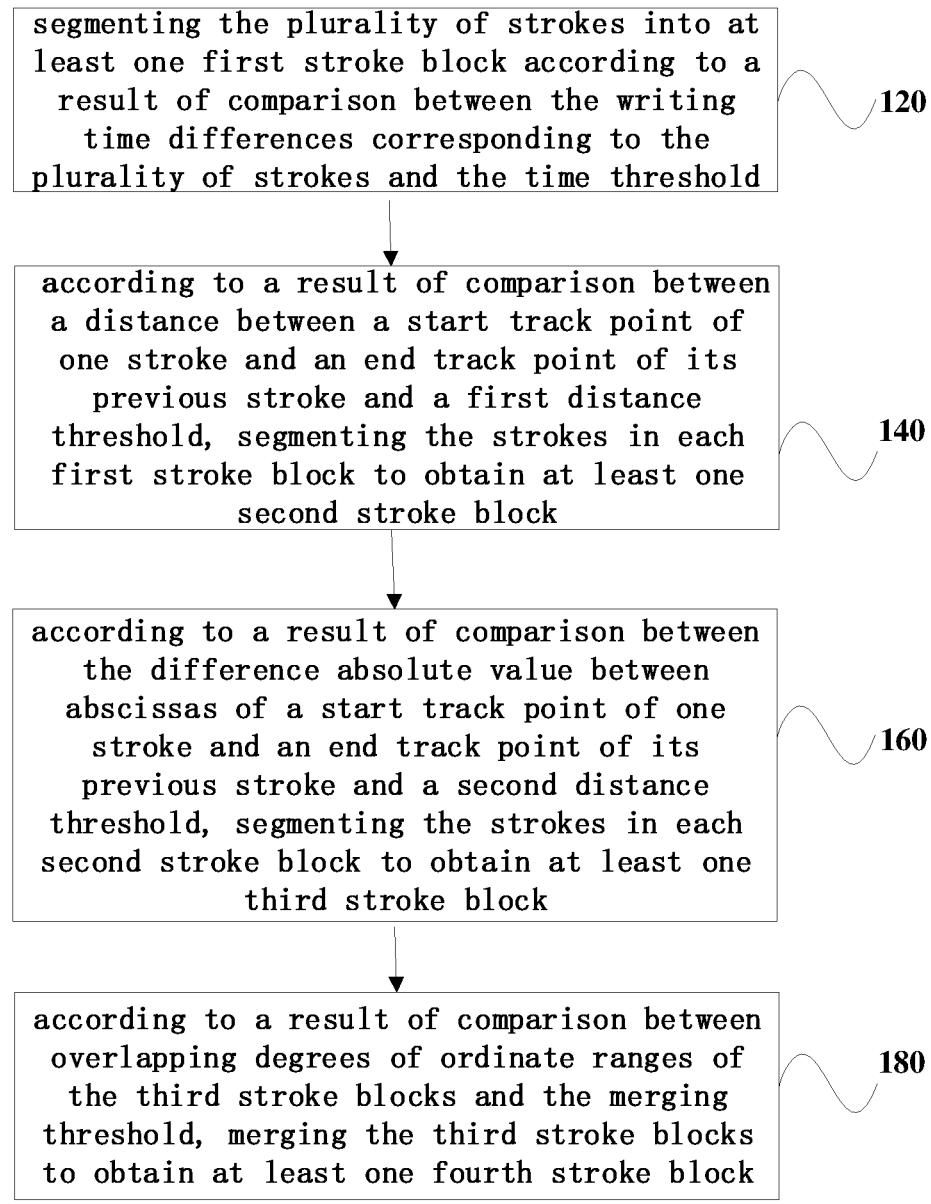
FIG. 1A is a flow diagram illustrating a handwritten text segmentation method according to an embodiment of the present disclosure.

As shown in FIG. 1A, the handwritten text segmentation method according to an embodiment of the present disclosure comprises steps 120 to 180.

After dividing the plurality of track points into a plurality of strokes in the step S1, in step 120, the handwritten text is roughly segmented based on the writing time of the track points in the strokes, and the plurality of strokes are divided into at least one first stroke block, for example according to a result of comparison between the writing time differences corresponding to the plurality of strokes and the time threshold. Each first stroke block corresponds to one text segmentation unit or one text line, and the writing time difference between the strokes in each first stroke block is less than or equal to the time threshold.

Next, the handwritten text is further roughly segmented by using the distance between the track points. That is, in step 140, according to a result of comparison between the distance between a start track point of one stroke and an end track point of its previous stroke and a first distance threshold, the strokes in each first stroke block is segmented to obtain at least one second stroke block. Each second stroke block corresponds to one text segmentation subunit or one text line, and the distance between a start track point of one stroke and an end track point of its previous stroke in each second stroke block is less than or equal to the first distance threshold. The first distance threshold can be determined according to the average length of the plurality of strokes, e.g., 2.5 times the average length can be taken as the first distance threshold.

Then, the handwritten text is finely segmented by using horizontal distances (also called absolute value of the differences of abscissas) between the track points. That is, in step 160, according to a result of comparison between the absolute value of the difference between abscissas of a start track point of one stroke and an end track point of its previous stroke and a second distance threshold, the strokes in each second stroke block is segmented to obtain at least one third stroke block. Each third stroke block corresponds to one text segmentation subunit or one text line, and a distance between a start track point of one stroke and an end track point of its previous stroke in each third stroke block is less than or equal to the second distance threshold.

In some embodiments, the second distance threshold corresponds to the foregoing segmentation threshold. In other embodiments, in view of difference stroke lengths of large and small fonts, the second distance threshold is determined based on an average length of the strokes in each second stroke block, e.g., 1.5 times the average length can be taken as the second distance threshold.

Finally, in order to avoid dividing the handwritten text in a same line into different lines, in step 180, according to a result of comparison between overlapping degrees between ordinate ranges of the third stroke blocks and the merging threshold, the third stroke blocks are merged to obtain at least one fourth stroke block. For example, in the case that an overlapping degree of the ordinate ranges of two third stroke blocks is greater than the merging threshold (e.g., 0.5), the two third stroke blocks are merged into one fourth stroke block. Each fourth stroke block corresponds to one text segmentation unit or one text line. The result of the fourth division stroke can be taken as the text segmentation result of the handwritten text. Based on the text segmentation result, the handwritten text can be recognized.

In addition, the online text segmentation result described above can be also combined with an offline text detection result, to further improve the accuracy of the text segmentation.

Figure 2:
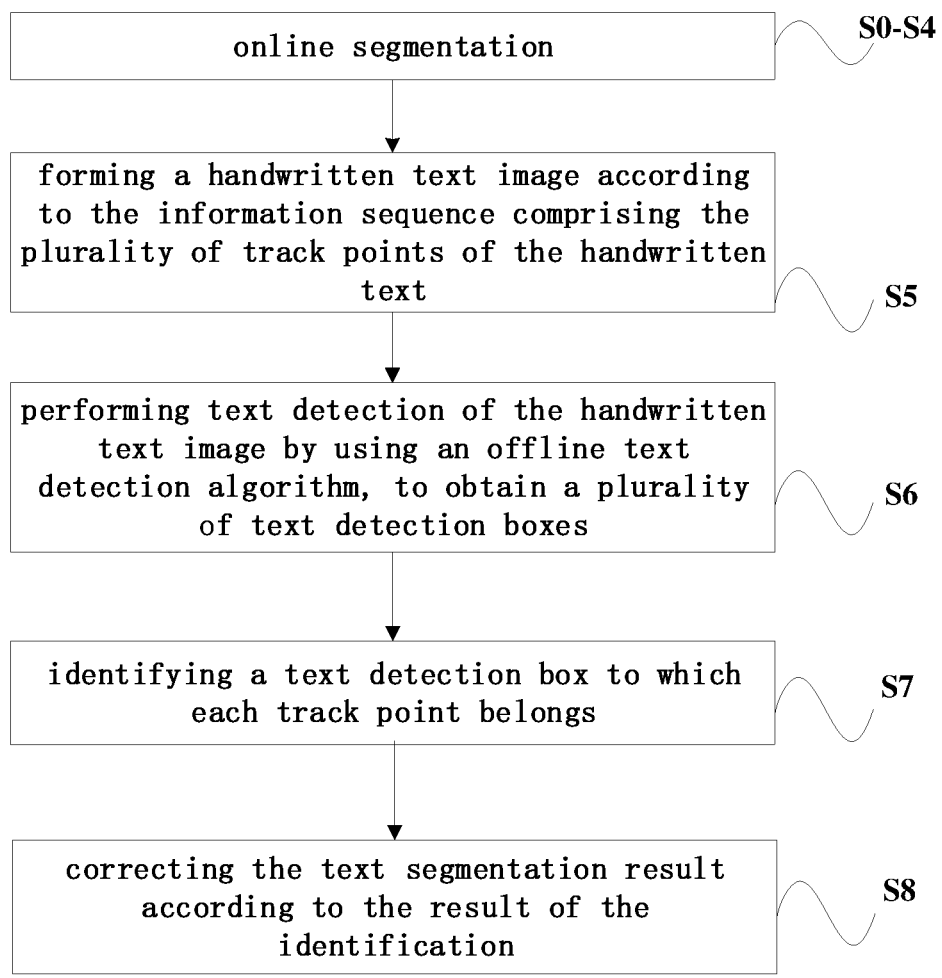
FIG. 2 is a flow diagram illustrating a handwritten text recognition method according to another embodiment of the present disclosure.

FIG. 2 is a flowchart illustrating a handwritten text recognition method according to another embodiment of the present disclosure. FIG. 2 differs from FIG. 1 in that the handwritten text recognition method in FIG. 2 further comprises steps S5 to S8, in which the text is further segmented in conjunction with the offline text detection result. Only differences between FIG. 2 and FIG. 1 will be described below, and the same parts will not be repeated.

In step S5, a handwritten text image is formed according to the information sequence comprising the plurality of track points of the handwritten text.

A flow of forming the handwritten text image according to some embodiments of the present disclosure will be described below in conjunction with FIG. 2A. As shown in FIG. 2A, the flow of forming the handwritten text image comprises steps S51 to S54.

In step S51, the maximum $X_{max}$ and the minimum $X_{min}$ of the abscissas, and the maximum $Y_{max}$ and the minimum $Y_{min}$ of the ordinates of the plurality of track points are counted to obtain an abscissa range $X_{range}=X_{max}-X_{min}$ and an ordinate range $Y_{range}=Y_{max}-Y_{min}$. The abscissa range can correspond to a text width and the ordinate range can correspond to a text length.

In step S52, scaling coefficients $R_X=I_{width}/X_{range}$ and $R_Y=I_{height}/Y_{range}$ are calculated according to the specified image sizes $I_{width}$ and $I_{height}$, the abscissa range $X_{range}$, and the ordinate range $Y_{range}$.

In step S53, the abscissa and ordinate values of each track point are scaled respectively according to the scaling coefficients $R_X$ and $R_Y$, to obtain a plurality of track points with scaled coordinates.

For example, the abscissa of each track point is multiplied by the scaling coefficient $R_X$ to obtain the scaled abscissa; and the ordinate of each track point is multiplied by the scaling coefficient $R_Y$ to obtain the scaled ordinate.

In step S54, the plurality of track points with the scaled coordinates are connected to form the handwritten text image, wherein an end track point of one stroke is not connected with a start track point of its next stroke.

Of course, the plurality of track points can first be connected to form an image, and then the image can be scaled according to the relationship between the specified image sizes and the abscissa and ordinate ranges.

Next, in step S6, text detection of the handwritten text image is performed by using an offline text detection algorithm, to obtain a plurality of text detection boxes. The offline text detection algorithm can employ existing offline text detection algorithms, e.g., a network based on Contour-Net training. One text detection box corresponds to one line of characters, and different text detection boxes correspond to different lines of characters. In other words, characters in one text detection box belong to the same one line, and characters in different text detection boxes belong to different lines.

In step S7, a text detection box to which each track point belongs is identified.

Figure 2B:
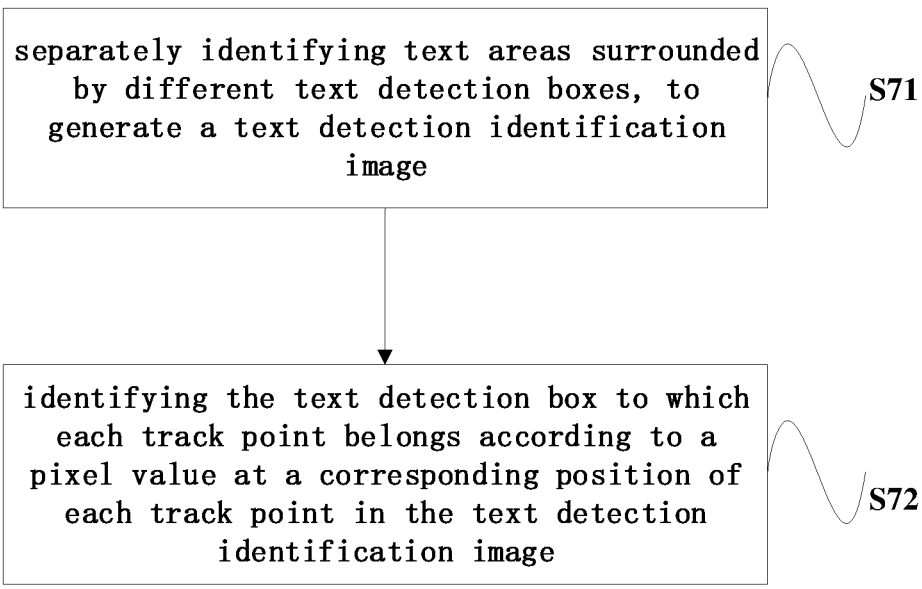
FIG. 2B is a flow diagram illustrating identifying a text detection box to which each track point belongs according to an embodiment of the present disclosure.

A flow of identifying a text detection box to which each track point belongs according to some embodiments of the present disclosure will be described below in conjunction with FIG. 2B. As shown in FIG. 2B, the flow of identifying the text detection box to which each track point belongs comprises steps S71 to S72.

In step S71, text areas surrounded by different text detection boxes are separately identified, to generate a text detection identification image. For example, a connected domain filling algorithm is employed for identification. Text areas surrounded by one text detection box are connected, and text areas surrounded by different text detection boxes are not connected. Different connected domains can be filled with different colors. In some embodiments, image areas that do not belong to any text area have a first pixel value (e.g., 0), text areas surrounded by a same text detection box have a same second pixel value (e.g., an integer greater than 0), and text areas surrounded by different text detection boxes have different second pixel values (e.g., 1, 2, 3 . . . , respectively).

In step S72, the text detection box to which each track point belongs is identified according to a pixel value at a corresponding position of each track point in the text detection identification image. For example, for a track point A, its corresponding position in the text detection identification image can be determined according to its scaled abscissa and ordinate, and then it is judged whether the track point A belongs to a certain text detection box according to a pixel value at this position. Specifically, in the case that the pixel value at this position is the first pixel value (e.g., 0), it is judged that the track point A does not belong to any text detection box; if the pixel value at this position is the second pixel value (e.g., 1), it is judged that the track point A belongs to a text detection box corresponding to the pixel value 1. Similarly, a similar judgment can be made for a track point B. If a pixel value at a corresponding position of the track point B in the text detection identification image is also 1, it is judged that the track points B and A belong to a same text detection box, and if the pixel value is the second pixel value (e.g., 2) different from 1, it is judged that the track points B and A belong to different text detection boxes.

Next, the text segmentation is performed according to a result of the identification. In step S8, the text segmentation result is corrected according to the result of the identification.

Figure 2C:
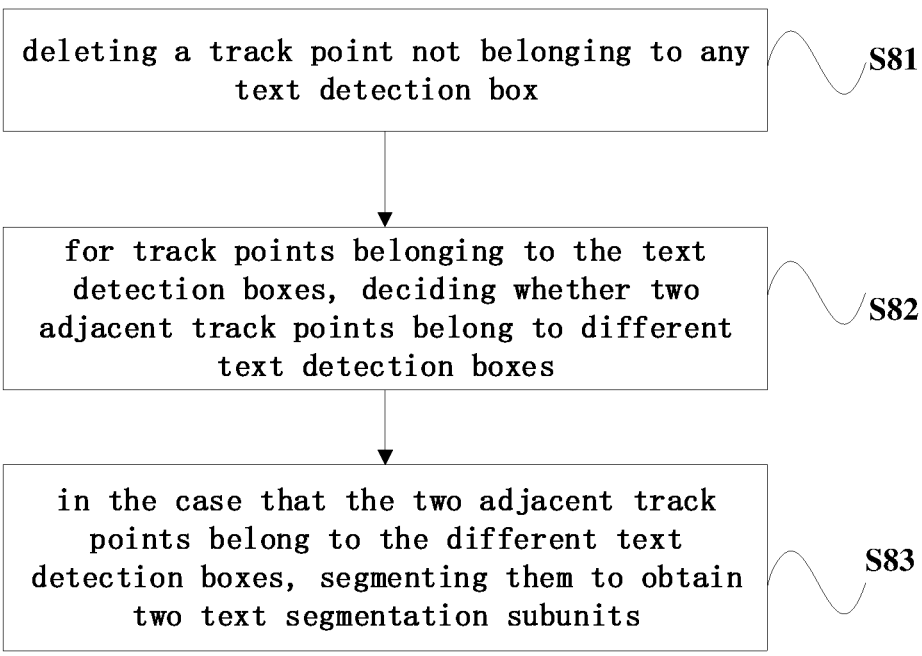
FIG. 2C is a flow diagram illustrating performing text segmentation based on a result of the identification according to an embodiment of the present disclosure.

A flow of performing text segmentation according to the result of the identification according to some embodiments of the present disclosure will be described in conjunction with FIG. 2C. As shown in FIG. 2C, a flow of correcting the text segmentation result according to the result of the identification comprises steps S81 to S83.

In step S81, track points not belonging to any text detection box are deleted. In this way, some noise can be ignored to avoid the adverse effect of the noise on the text segmentation.

In step S82, for track points belonging to the text detection boxes, it is judged whether two adjacent track points belong to different text detection boxes.

In step S83, in the case that the two adjacent track points belong to the different text detection boxes, they are segmented to obtain two text segmentation subunits.

For example, for the handwritten text written horizontally in lines first and then obliquely, an offline segmentation result is more accurate. The online segmentation result is corrected by using the offline segmentation result, so that the accuracy of the text segmentation can be further improved.

In the above embodiment, it is described that the online text segmentation result is obtained according to the statistical information of the track points, and it is also described that the online segmentation result is corrected by using the offline segmentation result to further improve the accuracy of the text segmentation. A text recognition result obtained according to the text segmentation result will be further described below, and the text segmentation result can be recognized by, for example, utilizing a text recognition model of bidirectional long/short term memory (BiLSTM), to obtain the text recognition result.

The text recognition model can consist of multiple (e.g., three) BiLSTM stacks, followed by two fully-connected layers for classification. The three BiLSTMs can contain 256, 256 and 512 cells, respectively, and the two fully-connected layers contain 512 and 3816 neurons, respectively. Here, 3816 represents a final classification category, including 3755 Chinese characters in the primary character library of Chinese characters, 26 English letters, 10 Arabic numerals, and 25 common punctuation marks. Each LSTM is also followed by a Dropout layer with a probability of 0.5, for randomly removing partial connections so as to reduce over fitting of the model and accelerate the convergence of the model.

In some embodiments, in order to improve the accuracy of the text recognition, before the text segmentation result is input into the text recognition model, an inclined text line (i.e., the text segmentation unit) can be rotated and transformed to a common left-to-right writing direction (i.e., horizontal direction). This will be described below in conjunction with a schematic diagram of an inclined text line shown in FIG. 2D.

Figure 2D:
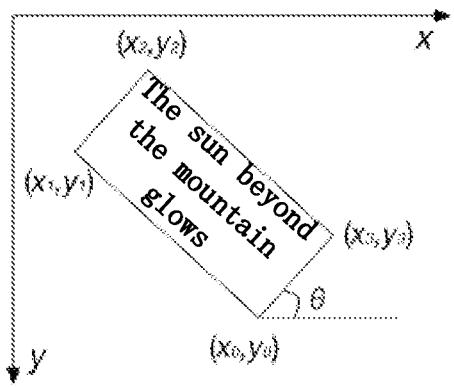
FIG. 2D is a schematic diagram illustrating an inclined text line according to an embodiment of the present disclosure.

As shown in FIG. 2D, an angle θ of each text segmentation unit relative to the horizontal direction can be obtained by using a minimum bounding rectangle algorithm; and rotation transformation is performed for the track points included in each text segmentation unit according to the angle θ of each text segmentation unit. Specifically, the connected domain can be calculated according to the track points in the text line, for example, after the track points in the text segmentation unit are connected, an angle of the text line relative to the horizontal direction is obtained according to the minimum bounding rectangle algorithm, so that the text line is rotated and transformed into the horizontal direction. The minimum bounding rectangle can be defined by coordinates $(X_1, Y_1)$, $(X_2, Y_2)$, $(X_3, Y_3)$, $(X_4, Y_4)$.

In other embodiments, in order to improve the efficiency of the text recognition, redundant track points can be deleted before the text recognition, to reduce the amount of data to be recognized, thereby improving the recognition speed. For example, slopes of lines connecting each track point in a stroke with its previous and next track points are calculated separately; and for one track point in each stroke, the track point is deleted in the case that a difference between the slopes of the lines connecting it with its previous and next track points is less than or equal to a change threshold. If the difference between the slopes of the lines connecting the track point with its previous and next track points is less than or equal to the change threshold (e.g., 0.1), then it can be considered that the three track points are on a straight line, therefore, the track point can be deleted to reduce the amount of data to be recognized.

In still other embodiments, in order to improve the text recognition effect, considering that coordinate ranges of the track points in each text line differ greatly, the track points of each text line can be normalized before the text recognition. For example, the ordinates of the track points included in each text segmentation unit can be normalized, for example, to a range of 0 to 1, and the abscissas and the ordinates are scaled in proportion.

The embodiment of the present disclosure further provides a handwritten text search method comprising: acquiring an information sequence comprising a plurality of track points of handwritten text to be searched; dividing the plurality of track points into a plurality of strokes; recognizing the handwritten text to be searched by utilizing a stroke-based handwritten text recognition model, to obtain a text identification result; and in response to a search command input by a user, executing a corresponding search in the obtained text recognition result.

In some embodiments, that recognizing the handwritten text to be searched to obtain a text recognition result comprises: according to the handwritten text recognition method of any of the forgoing embodiments, recognizing the handwritten text to be searched to obtain the text recognition result.

Thus far, various method embodiments of the present disclosure have been described in detail, and corresponding product embodiments will be described below. The embodiment of the present disclosure also provides a handwritten text recognition apparatus.

Figure 3A:
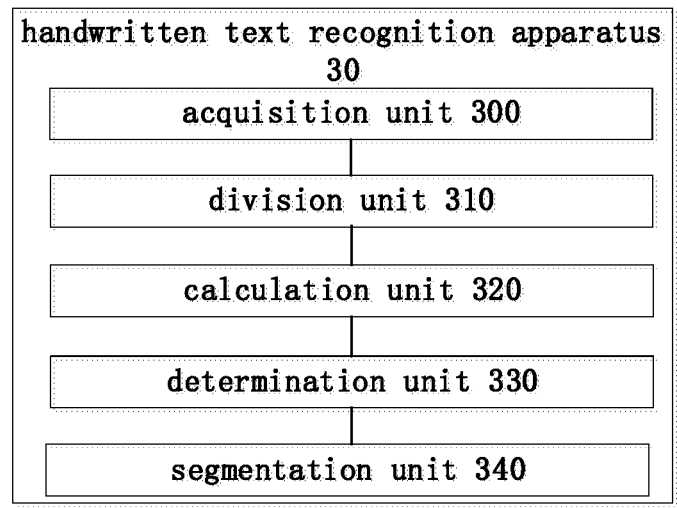
FIG. 3A is a block diagram illustrating a handwritten text recognition apparatus according to an embodiment of the present disclosure.

FIG. 3A is a block diagram illustrating the handwritten text recognition apparatus according to an embodiment of the present disclosure.

As shown in FIG. 3A, the handwritten text recognition apparatus 30 comprises an acquisition unit 300, a division unit 310, a calculation unit 320, a determination unit 330, and a segmentation unit 340.

The acquisition unit 300 is configured to acquire an information sequence comprising a plurality of track points of handwritten text, the information on each track point comprises its abscissa, writing time and writing state value, for example, to perform the step S0.

The division unit 310 is configured to divide the plurality of track points into a plurality of strokes according to the writing state value of each track point, for example, to perform the step S1.

The calculation unit 320 is configured to calculate a first segmentation threshold of the handwritten text, for example, to perform the step S2.

The determination unit 330 is configured to determine a first text segmentation point according to a result of comparison between an absolute value of a difference between abscissas of a start track point of one stroke and an end track point of its previous stroke and a first segmentation threshold, for example, to perform the step S3.

The segmentation unit 340 is configured to perform text segmentation according to the first text segmentation point to obtain a text segmentation result, for example, to perform the step S4.

Figure 3B:
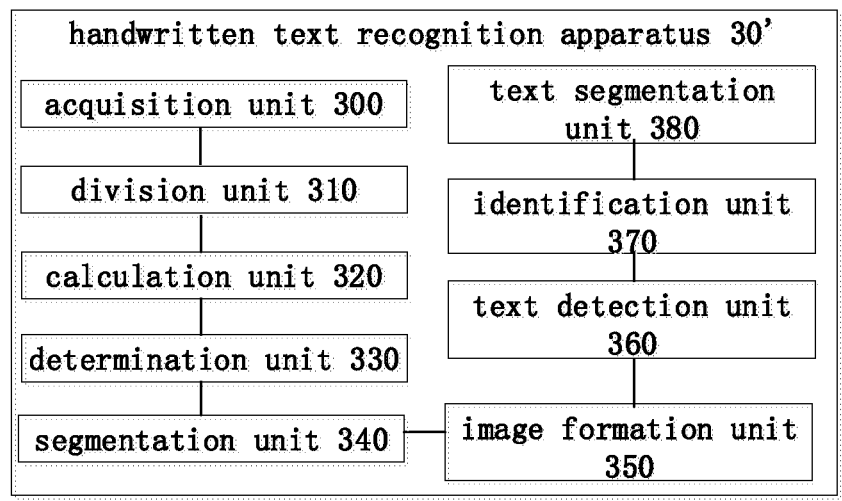
FIG. 3B is a block diagram illustrating a handwritten text recognition apparatus according to another embodiment of the present disclosure.

FIG. 3B is a block diagram illustrating a handwritten text recognition apparatus according to another embodiment of the present disclosure. FIG. 3B differs from FIG. 3A in that the handwritten text recognition apparatus 30' in FIG. 3B further comprises an image formation unit 350, a text detection unit 360, an identification unit 370, and a text segmentation unit 380. Only the differences between FIG. 3B and FIG. 3A will be described below, and the same parts will not be repeated.

The image formation unit 350 is configured to form a handwritten text image according to the information sequence comprising the plurality of track points of the handwritten text, for example, to perform the step S5.

The text detection unit 360 is configured to perform text detection of the handwritten text image by using the offline text detection algorithm, to obtain a plurality of text detection boxes, for example, to perform the step S6.

The identification unit 370 is configured to identify a text detection box to which each track point belongs, for example, to perform the step S7.

The text segmentation unit 380 is configured to correct the text segmentation result according to the result of the identification, for example, to perform the step S8.

Figure 4:
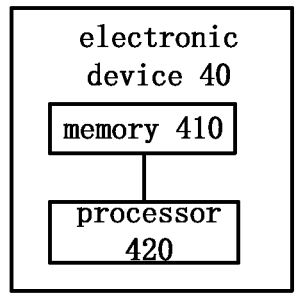
FIG. 4 is a block diagram illustrating an electronic device according to an embodiment of the present disclosure.

FIG. 4 is a block diagram illustrating an electronic device according to an embodiment of the present disclosure.

As shown in FIG. 4, the electronic device 40 comprises: a memory 410 and a processor 420 coupled to the memory 410. The memory 410 is configured to store instructions for executing embodiments corresponding to the handwritten text recognition method. The processor 420 is configured to perform, based on the instructions stored in the memory 410, one or more steps of the handwritten text recognition method or the handwritten text search method in any of the embodiments of the present disclosure. That is, the electronic device 40 can be the handwritten text recognition apparatus or the handwritten text search apparatus.

It should be understood that, one or more of the steps of the foregoing handwritten text recognition method can be realized by a processor, and can be realized by software, hardware, firmware, or any of their combinations.

In addition to the handwritten text recognition method and apparatus, the handwritten text search method and apparatus, embodiments of the present disclosure can also take the form of a computer program product implemented on one or more non-volatile storage media containing computer program instructions. Accordingly, the embodiments of the present disclosure also provide a computer-readable storage medium having stored thereon computer instructions which, when executed by a processor, implement one or more steps of the handwritten text recognition method or the handwritten text search method in any of the foregoing embodiments.

Figure 5A:
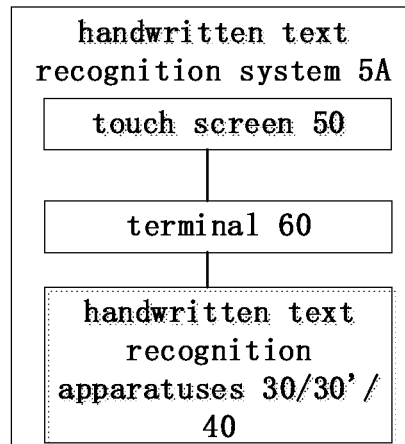
FIG. 5A is a block diagram illustrating a handwritten text recognition system according to an embodiment of the present disclosure.

FIG. 5A is a block diagram illustrating a handwritten text recognition system according to an embodiment of the present disclosure.

As shown in FIG. 5A, the handwritten text recognition system 5A comprises: a touch screen 50 configured to generate an information sequence comprising a plurality of track points when a user writes characters on the touch screen; and the above handwritten text recognition apparatuses 30, 30' or 40.

In some embodiments, the handwritten text recognition system 5A further comprises: a terminal 60 configured to acquire the information sequence comprising the plurality of track points generated when the characters are written on the touch screen, and send the information sequence to the handwritten text recognition apparatus.

As described above, the handwritten text recognition apparatuses 30, 30' or 40 can be located at a cloud server or an embedded terminal, to perform handwritten text segmentation of the received information sequence of the handwritten track points, and to transmit the text segmentation result to a designated receiving party, such as the cloud or terminal. The text segmentation result can be used for subsequent handwritten text recognition.

Figure 5B:
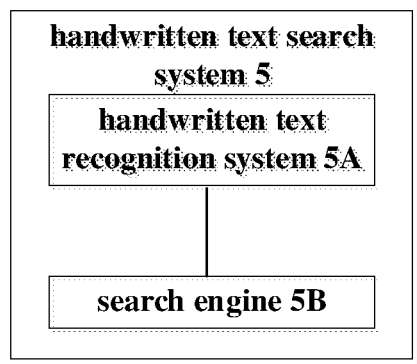
FIG. 5B is a block diagram illustrating a handwritten text search system according to an embodiment of the present disclosure.

FIG. 5B is a block diagram illustrating a handwritten text search system according to an embodiment of the present disclosure.

As shown in FIG. 5B, the handwritten text search system 5 comprises: the foregoing handwritten text recognition system 5A configured to recognize handwritten text to be searched to obtain a text recognition result; and a search engine 5B configured to in response to a search command input by the user, execute a corresponding search in the obtained text recognition result.

Figure 6:
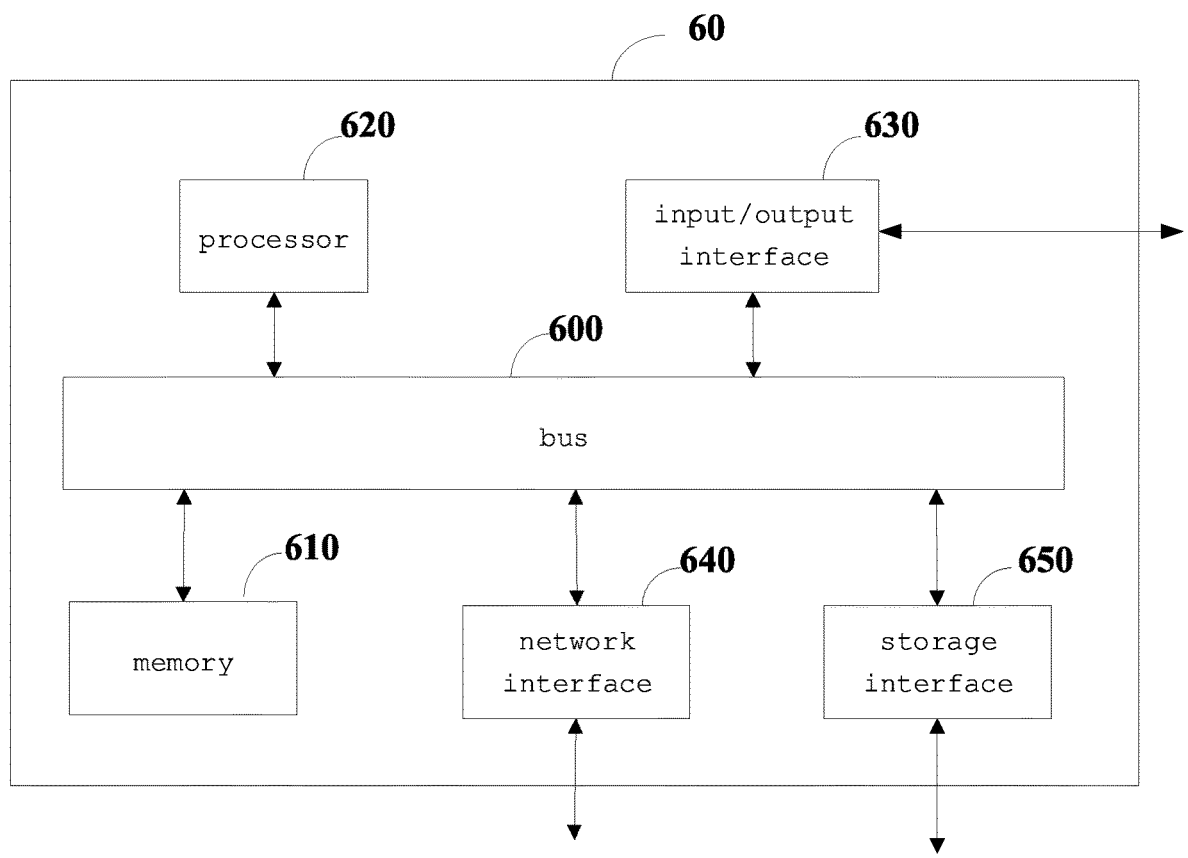
FIG. 6 is a block diagram illustrating a computer system for implementing some embodiments of the present disclosure.

FIG. 6 is a block diagram illustrating a computer system for implementing some embodiments of the present disclosure.

As shown in FIG. 6, the computer system can be embodied in the form of a general purpose computing device, and the computer system can be used to implement the handwritten text recognition apparatus of the embodiments described above. The computer system comprises a memory 610, a processor 620, and a bus 600 connecting different system components.

The memory 610 can include, for example, a system memory, a non-volatile storage medium, and the like. The system memory has stored thereon, for example, an operating system, an application program, a Boot Loader, and other programs. The system memory can include a volatile storage medium, such as a Random Access Memory (RAM) and/or cache memory. The non-volatile storage medium has stored thereon, for example, instructions to execute the corresponding embodiments of the display method. The non-volatile storage medium includes, but is not limited to, a magnetic disk memory, optical memory, flash memory, and the like.

The processor 620 can be implemented by a general purpose processor, Digital Signal Processor (DSP), Application Specific Integrated Circuit (ASIC), Field Programmable Gate Arrays (FPGA) or other programmable logic devices, a discrete hardware component such as discrete gate or transistor. Accordingly, each device, such as the judgment device and the determination device, can be implemented by a Central Processing Unit (CPU) running instructions in a memory for performing the corresponding steps, or can be implemented by a dedicated circuit to perform the corresponding steps.

Any of a variety of bus architectures can be used for the bus 600. For example, the bus architectures include, but are not limited to, an Industry Standard Architecture (ISA) bus, Micro Channel Architecture (MCA) bus, and Peripheral Component Interconnect (PCI) bus.

The computer system can further comprise input/output interfaces 630, network interfaces 640, storage interfaces 650, and the like. These interfaces 630, 640, 650, and the memory 610 and the processor 620 can be connected through the bus 600. The input/output interfaces 630 can provide connection interfaces for input/output devices such as display, mouse, and keyboard. The network interfaces 640 provide connection interfaces for a variety of networking devices. The storage interfaces 640 provide connection interfaces for external storage devices such as floppy disk, U disk, and SD card.

Thus far, various embodiments of the present disclosure have been described in detail. Some details well known in the art have not been described in order to avoid obscuring the concept of the present disclosure. Those skilled in the art can now fully appreciate how to implement the technical solution disclosed herein, in view of the foregoing description.

Although some specific embodiments of the present disclosure have been described in detail by way of example, it should be understood by those skilled in the art that, the above examples are only for illustration, and are not intended to limit the scope of the present disclosure. It will be understood by those skilled in the art that, modifications to the above embodiments or equivalent substitutions for parts of the technical features can be made without departing from the scope and spirit of the present disclosure. The scope of the present disclosure is defined by the appended claims.

What is claimed is:

1. A handwritten text recognition method comprising:
   acquiring an information sequence comprising a plurality of track points of handwritten text, wherein information on each track point of the plurality of track points comprises an abscissa, writing time and writing state value of the track point;
   dividing the plurality of track points into a plurality of strokes according to the writing state value of each track point, wherein the writing state value comprises a first value representative of stroke pen-up and a second value representative of stroke pen-down, respectively;
   calculating a first segmentation threshold of the handwritten text;
   determining a first text segmentation point according to a result of comparison between an absolute value of a difference, which is between abscissas of a start track point of one stroke and an end track point of a previous stroke thereof, and the first segmentation threshold; and
   performing text segmentation according to the first text segmentation point to obtain a text segmentation result.

2. The handwritten text recognition method according to claim 1, wherein the determining the first text segmentation point comprises:
   in a case that the absolute value of the difference between the abscissas of the start track point of the one stroke and the end track point of the previous stroke is greater than the first segmentation threshold, determining the start track point as the first text segmentation point.

3. The handwritten text recognition method according to claim 1, wherein the first segmentation threshold comprises a first sub-segmentation threshold, and the calculating the first segmentation threshold of the handwritten text comprises:
   calculating the first sub-segmentation threshold of the handwritten text according to statistical information on the absolute value of the difference between the abscissas of the start track point of each stroke except a first stroke and the end track point of the previous stroke in the handwritten text.

4. The handwritten text recognition method according to claim 3, wherein the statistical information comprises a mean and a variance, and the calculating the first sub-segmentation threshold of the handwritten text comprises:
   calculating the first sub-segmentation threshold according to a sum of the mean and the variance.

5. The handwritten text recognition method according to claim 3, wherein the first segmentation threshold further comprises a second sub-segmentation threshold, and the calculating the first segmentation threshold of the handwritten text comprises:

calculating the second sub-segmentation threshold according to a difference between a maximum and a minimum of abscissas of the plurality of track points.

6. The handwritten text recognition method according to claim 5, wherein the statistical information comprises a mean and a variance, and wherein:
the determining the first text segmentation point comprises: in a case that the variance is greater than or equal to the mean, or the first sub-segmentation threshold is greater than or equal to the second sub-segmentation threshold, deciding whether the absolute value of the difference between the abscissas of the start track point of one stroke and the end track point of the previous stroke is greater than the first segmentation threshold; or
the determining the first text segmentation point comprises: in a case that the absolute value of the difference is greater than the first sub-segmentation threshold or the second sub-segmentation threshold, determining the start track point as the first text segmentation point.

7. The handwritten text recognition method according to claim 1, wherein the handwritten text recognition method further comprises:
before the determining the first text segmentation point, determining a second text segmentation point according to a result of comparison between writing time differences corresponding to the plurality of strokes and a second segmentation threshold; and
dividing the plurality of strokes into at least one text segmentation unit according to the second text segmentation point, wherein the writing time differences between the strokes in each text segmentation unit each are less than or equal to the second segmentation threshold.

8. The handwritten text recognition method according to claim 7, wherein the information on each track point further comprises an ordinate, and the handwritten text recognition method further comprises:
before the determining the first text segmentation point, determining a third text segmentation point according to a result of comparison between a distance, which is between the start track point of one stroke and the end track point of the previous stroke, and a third segmentation threshold; and
according to the third text segmentation point, segmenting the strokes in each text segmentation unit obtained according to the second text segmentation point, to obtain a plurality of text segmentation subunits, wherein the distance between the start track point of one stroke and the end track point of the previous stroke in each text segmentation subunit is less than or equal to the third segmentation threshold.

9. The handwritten text recognition method according to claim 8, wherein:
the third segmentation threshold is determined according to an average length of the plurality of strokes; or
the first segmentation threshold is determined according to an average length of strokes in each text segmentation subunit.

10. The handwritten text recognition method according to claim 1, wherein the performing text segmentation according to the first text segmentation point to obtain the text segmentation result comprises:
merging text segmentation units based on a result of comparison between overlapping degrees, which are between ordinate ranges of the track points included in the text segmentation units obtained according to the first text segmentation point, and a merging threshold, to obtain the text segmentation result.

11. The handwritten text recognition method according to claim 1, further comprising:
forming a handwritten text image according to the information sequence comprising the plurality of track points of the handwritten text;
performing text detection of the handwritten text image by using an offline text detection algorithm to obtain at least one text detection box;
identifying a text detection of the at least one text detection box, to which each track point belongs; and
correcting the text segmentation result according to a result of the identifying.

12. The handwritten text recognition method according to claim 11, wherein the correcting the text segmentation result according to the result of the identifying comprises:
deleting a track point not belonging to any text detection box;
for track points belonging to the text detection boxes, deciding whether two adjacent track points belong to different text detection boxes; and
in a case that the two adjacent track points belong to different text detection boxes, segmenting the two adjacent track points to obtain two text segmentation subunits.

13. The handwritten text recognition method according to claim 11, wherein the identifying the text detection box to which each track point belongs comprises:
separately identifying text areas surrounded by different text detection boxes, to generate a text detection identification image, wherein an image area not belonging to any text area in the text detection identification image has a first pixel value, text areas surrounded by a same text detection box have a same second pixel value, and text areas surrounded by different text detection boxes have different second pixel values; and
identifying the text detection box to which each track point belongs according to a pixel value at a corresponding position of each track point in the text detection identification image.

14. The handwritten text recognition method according to claim 11, wherein the information on each track point further comprises an ordinate, and the forming a handwritten text image according to the information sequence comprising the plurality of track points of the handwritten text comprises:
counting a maximum $X_{max}$ and a minimum $X_{min}$ of the abscissas, a maximum $Y_{max}$ and a minimum $Y_{min}$ of the ordinates of the plurality of track points, to obtain an abscissa range $X_{range}=X_{max}-X_{min}$ and an ordinate range $Y_{range}=Y_{max}-Y_{min}$;
calculating scaling coefficients $R_X=I_{width}/X_{range}$ and $R_Y=I_{height}/Y_{range}$ according to specified image sizes $I_{width}$ and $I_{height}$, the abscissa range $X_{range}$ and the ordinate range $Y_{range}$;
scaling the abscissa and the ordinate of each track point respectively according to the scaling coefficients $R_X$ and $R_Y$, to obtain a plurality of track points with scaled coordinates; and
connecting the plurality of track points with the scaled coordinates, to form the handwritten text image, wherein the end track point of one stroke is not connected with the start track point of a next stroke thereof.

15. The handwritten text recognition method according to claim 1, further comprising at least one of:
for one track point in each stroke, deleting the track point in a case that a difference between slopes of lines connecting the track point with a previous and next track points is less than or equal to a change threshold;

normalizing ordinates of the track points included in each text segmentation unit, the abscissas being scaled with the ordinates in proportion;

obtaining an angle of each text segmentation unit relative to a horizontal direction by using a minimum bounding rectangle algorithm, and performing rotation transformation of the track points included in each text segmentation unit according to the angle of each text segmentation unit; or recognizing the text segmentation result using a text recognition model of bidirectional long/short term memory (BiLSTM), to obtain a text recognition result.

16. A handwritten text search method comprising:

acquiring an information sequence comprising a plurality of track points of handwritten text to be searched;

dividing the plurality of track points into a plurality of strokes;

recognizing the handwritten text to be searched using a stroke-based handwritten text recognition model, to obtain a text recognition result; and in response to a search command input by a user, performing a corresponding search in the obtained text recognition result, wherein the recognizing the handwritten text to be searched to obtain the text recognition result comprises:

recognizing the handwritten text to be searched according to the handwritten text recognition method of claim 1, to obtain the text recognition result.

17. A handwritten text recognition system comprising:

a touch screen configured to generate an information sequence comprising a plurality of track points when a user writes characters on the touch screen; and a handwritten text recognition apparatus configured to perform the handwritten text recognition method according to claim 1.

18. A handwritten text search system comprising:

the handwritten text recognition system according to claim 17, configured to recognize the handwritten text to be searched to obtain a text recognition result; and a search engine configured to in response to a search command input by a user, perform a corresponding search in the obtained text recognition result.

19. An electronic device comprising:

a memory; and a processor coupled to the memory, wherein the processor is configured to perform the handwritten text recognition method according to claim 1, based on instructions stored in the memory.

20. A non-transitory computer-readable storage medium having stored thereon a computer program which, when executed by a processor, implements the handwritten text recognition method according to claim 1.

* * * * *

UNITED STATES PATENT AND TRADEMARK OFFICE
CERTIFICATE OF CORRECTION

| | |
|---|---|
| PATENT NO. | : 11,823,474 B2 |
| APPLICATION NO. | : 17/428811 |
| DATED | : November 21, 2023 |
| INVENTOR(S) | : Huanhuan Zhang et al. |

It is certified that error appears in the above-identified patent and that said Letters Patent is hereby corrected as shown below:

In the Claims

Column 20, Line 11, Claim 11, after "detection" insert -- box --

Signed and Sealed this
Twenty-third Day of January, 2024

Katherine Kelly Vidal
*Director of the United States Patent and Trademark Office*